United States Patent
Hung

(10) Patent No.: US 6,977,093 B2
(45) Date of Patent: Dec. 20, 2005

(54) HEALTH FOOD PROCESSING PROCESS USING GERMINATED RICE TO MAKE HEALTH FOOD CONTAINING NATURAL EATABLE FIBERS, GABA, IP6, AND PROBIOTIC

(76) Inventor: Chien-Lung Hung, 7/F-1, No. 192, Chienkuo N. Rd., Sec. 2, Taipei City (TW)

( * ) Notice: Subject to any disclaimer, the term of this patent is extended or adjusted under 35 U.S.C. 154(b) by 265 days.

(21) Appl. No.: 10/394,241

(22) Filed: Mar. 24, 2003

(65) Prior Publication Data

US 2004/0191392 A1  Sep. 30, 2004

(51) Int. Cl.[7] .................. A23L 1/105; A23L 1/302
(52) U.S. Cl. .................. 426/636; 426/44; 426/518; 426/520; 426/615
(58) Field of Search .................. 426/44, 615, 636, 426/518, 520

(56) References Cited

U.S. PATENT DOCUMENTS 5,733,539 A * 3/1998 Kitano et al. .................. 424/84
6,210,734 B1 * 4/2001 Jun ............................ 426/523

FOREIGN PATENT DOCUMENTS

JP  404117253 A  *  4/1992
JP  2000300196     * 10/2001

* cited by examiner

Primary Examiner—Helen Pratt
(74) Attorney, Agent, or Firm—Rosenberg, Klein & Lee

(57) ABSTRACT

A health food processing process, in which inflated germinated rice is ground into rice powder and mixed with a high-concentration probiotic fluid, and then the mixture is fermented and dried in a refrigerated air dryer, forming a dried fermented health food containing natural eatable fibers, GABA, IP6 and probiotic.

7 Claims, 2 Drawing Sheets

US 6,977,093 B2

HEALTH FOOD PROCESSING PROCESS USING GERMINATED RICE TO MAKE HEALTH FOOD CONTAINING NATURAL EATABLE FIBERS, GABA, IP6, AND PROBIOTIC

BACKGROUND OF THE INVENTION

1. Field of the Invention

The present invention relates to health foods and, more particularly, to a health food processing process that processes inflated germinated rice a health food containing natural eatable fibers, GABA, IP6 and probiotic.

2. Description of the Related Art

Various medical researches and studies regarding the effect of GABA (gamma-aminobutyric acid) in nerve system have been reported. However, there are known few studies on GABA foods and their physical effects. It is known that there are more than 200~300 kinds of bacteria in intestines. The total counts of bacteria in intestines can be as many as 100~200 trillions, or about 1 kg. The intestinal bacteria produce more than 3000 enzymes that help metabolism and improve immunity. These enzymes need the support of vitamins and mineral substances. Unbalanced nutrition prohibits enzymes from carrying out their effects and may produces bad effects that are harmful to the health, i.e., good nutrition and enzymes complement each other. Intestinal bacteria balancing status may be obstructed when getting old, bearing much pressure for living, suffering environmental pollution, eating excessive amount of food additives, antibiotic or medicine. When intestinal bacteria balancing status obstructed, harmful bacteria start to stir up trouble, causing people to suffer the so-called "living habit diseases" or "circulation system diseases" such as hypertension, hyperlipemia, and diabetes. Further, following the prosperity of the society, people's incomes are greatly increased. Most people living in cities eat much but spend little time in physical exercises. In order to get rid of diseases, people may eat a variety of health foods or take medicines of questionable sources without instructions of a doctor. Taking medicines of questionable sources may cause unexpected bad effects. Further, commercially available health foods may be not good to all people.

Currently, a variety of health foods such as enzymes, milk containing probiotic, yogurt, vitamins, and etc. are commercially available. However, the actual effects of these health foods are not definitely known. In the past time, may studies showed favorable effects of probiotic to the health. However, few people know that gastric acid is harmful to probiotic. Therefore, simply eating a big amount of probiotic gives little help to the health. In order to protect probiotic against gastric acid, health food manufacturers may add grained substances containing yogurt. The coating of the grained substances resists gastric acid. This method enables probiotic to be delivered to intestines. Further, it is well known that "full rice" is most nutritive. The so-called "full rice" is unpolished rice after removal of shells, having bran and germinate maintained intact. In order to enjoy good taste, people eat white rice instead of unpolished germinated rice. White rice has only albumen without germinate and bran. Unpolished germinated rice does not give a good taste, however it contains many nourishing substances that are good to the health. When the nourishing substances of unpolished germinated nice joined probiotic, it prevents the threatening of many blood diseases.

SUMMARY OF THE INVENTION

The present invention has been accomplished under the circumstances in view. It is one object of the present invention to provide a health food processing process, which uses germinated rice as probiotic carrier means to help probiotic multiply. It is another object of the present invention to provide a health food processing process, which uses germinated rice as probiotic carrier means to reduce damage to probiotic caused by gastric acid. It is another object of the present invention to provide a health food processing process, which uses germinated rice as probiotic carrier means to make a health food that prohibits the formation of PEP (propyl endopeptidase), improves the circulation of blood, enhancing the supply of oxygen, prevents or cures brain function disorder. It is still another object of the present invention to provide a health food processing process, which uses inflated germinated rice a high-concentration probiotic fluid to make a health food containing a big amount of natural eatable fibers, GABA (gamma-aminobutyric acid), IP6 (inositol hexaphosphate), and probiotic. To achieve these and other objects of the present invention, the health food processing process comprises the steps of: (a) preparing unpolished rice and sprouting the prepared unpolished rice to into unpolished germinated rice, and then inflating the unpolished germinated rice into inflated germinated rice; (b) cooling down the inflated germinated rice; (c) grinding the inflated germinated rice into rice powder in a clean room; (d) preparing a high-concentration probiotic fluid; (e) mixing the high-concentration fluid and the rice powder into a mixture; (f) fermenting the mixture in a fermentor, forming a fermented mixture; (g) drying the fermented mixture in a refrigerated air dryer, forming a dried fermented health food; and (h) grinding the dried fermented health food into health food powder.

DETAILED DESCRIPTION OF THE INVENTION

Figure 1:
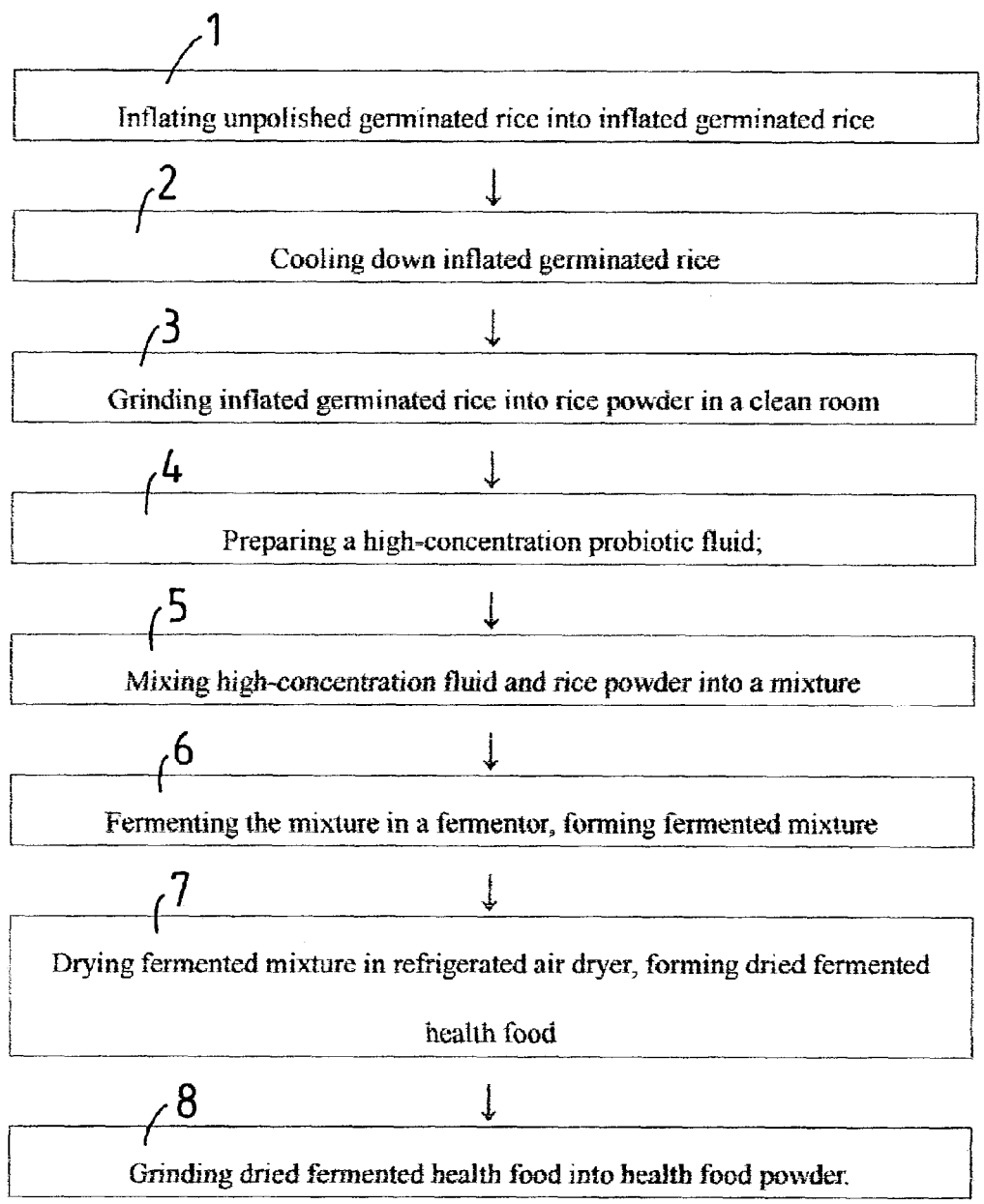
FIG. 1 is a flow chart explaining the health food processing process of the present invention.
Figure 2:
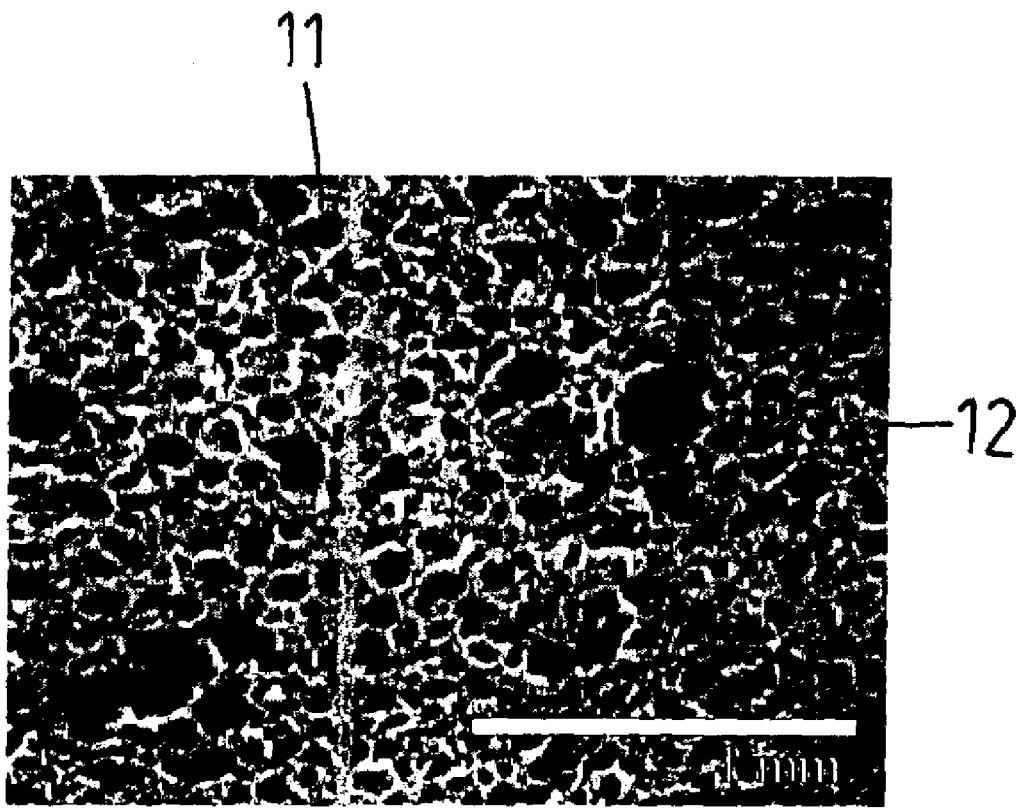
FIG. 2 is a microscopic view showing the inflated structure of inflated germinated rice according to the present invention.

Referring to FIGS. 1 and 2, the health food processing process of the present invention is to process unpolished germinated rice into health food containing natural eatable fibers, GABA (gamma aminobutyric acid), IP6 (inositol hexaphosphate) and probiotic.

The food processing process includes the steps explained hereinafter:

Step 1: Unpolished rice is selected and sprouted into unpolished germinated rice 11 of which the sprouts are about 0.5~1 mm long, and then unpolished germinated rice 11 thus obtained is inflated at 145~220° C. for about 1~5 minutes into inflated germinated rice having open spaces 12 in it and moisture content within about 10~20%.

Step 2: Inflated germinated rice thus obtained is then cooled down and received in a sterilized container;

Step 3: Cold inflated germinated rice thus obtained is then grounded into rice powder in a clean room subject to a predetermined particle size;

Step 4: A high-concentration probiotic fluid is prepared by means of a culturing process;

Step 5: The high-concentration probiotic fluid thus obtained is mixed with the aforesaid rice power, forming a mixture;

Step 6: The mixture thus obtained is then fermented in a fermentor and mixed while fermenting, causing probiotic to multiply;

Step 7: The mixture thus obtained from Step 6 is then dried in a refrigerated air dryer; and Step 8: The dried product thus obtained from Step 7 is then ground into powdered food, and processed into pills or tablets for eating.

A prototype of health food processing process has been constructed with the features of FIGS. 1 and 2. The health food processing process functions smoothly to provide all of the features discussed earlier.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A health food processing process for making a health food containing natural eatable fibers, GABA (gamma-aminobutyric acid), IP6 (inositol hexaphosphate), and probiotic, the health food processing process comprising the steps of:
   (a) providing unpolished rice and sprouting said unpolished rice to into unpolished germinated rice, and then inflating said unpolished germinated rice into inflated germinated rice;
   (b) cooling down said inflated germinated rice from step (a);
   (c) grinding said cooled inflated germinated rice from step (b) into rice powder in a clean room;
   (d) preparing a high-concentration probiotic culture;
   (e) mixing said high-concentration probiotic culture and said rice powder into a mixture, said rice powder being a carrier for said probiotic;
   (f) fermenting said mixture in a fermentor to form a fermented mixture; and
   (g) drying said fermented mixture in a refrigerated air dryer and forming a dried fermented health food containing said probiotic.

2. The health food processing process as claimed in claim 1, wherein said prepared unpolished rice is sprouted into unpolished germinated rice having sprouts about 0.5~1 mm long.

3. The health food processing process as claimed in claim 1, further comprising the step of grinding said dried fermented health food into health food powder.

4. The health food processing process as claimed in claim 1, further comprising the step of processing said dried fermented health food into pills and tablets.

5. The health food processing process as claimed in claim 1, wherein said inflated germinated rice has a moisture content within about 10~20%.

6. The health food processing process as claimed in claim 1, wherein said unpolished germinated rice is inflated at 145~220° C.

7. The health food processing process as claimed in claim 6, wherein said unpolished germinated rice is inflated at 145~220° C. for about 1~5 minutes.

* * * * *